United States Patent
Kishi et al.

(10) Patent No.: US 10,436,312 B2
(45) Date of Patent: Oct. 8, 2019

(54) CONTROL SYSTEM FOR AUTOMATIC TRANSMISSION

(71) Applicant: Nissan Motor Co., Ltd., Yokohama-shi, Kanagawa (JP)

(72) Inventors: Daigo Kishi, Kanagawa (JP); Katsunori Satou, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 194 days.

(21) Appl. No.: 15/537,593

(22) PCT Filed: Dec. 3, 2015

(86) PCT No.: PCT/JP2015/083974
§ 371 (c)(1),
(2) Date: Jun. 19, 2017

(87) PCT Pub. No.: WO2016/125379
PCT Pub. Date: Aug. 11, 2016

(65) Prior Publication Data
US 2018/0128367 A1 May 10, 2018

(30) Foreign Application Priority Data
Feb. 6, 2015 (JP) .................. 2015-021683

(51) Int. Cl.
*F16H 59/18* (2006.01)
*F16H 61/16* (2006.01)
(Continued)

(52) U.S. Cl.
CPC ......... *F16H 59/18* (2013.01); *F16H 61/0276* (2013.01); *F16H 61/16* (2013.01);
(Continued)

(58) Field of Classification Search
CPC ...... F16H 59/18; F16H 61/16; F16H 61/0276; F16H 61/66259; F16H 61/66227;
(Continued)

(56) References Cited

U.S. PATENT DOCUMENTS 6,799,109 B2 * 9/2004 Nakamori ............. B60W 10/30
475/254
8,002,059 B2 * 8/2011 Tanishima ............. B60K 6/365
180/65.275
(Continued)

FOREIGN PATENT DOCUMENTS

| CN | 102667255 A | 9/2012 |
| CN | 103133681 A | 6/2013 |

(Continued)

*Primary Examiner* — Tinh T Dang
(74) *Attorney, Agent, or Firm* — Young Basile Hanlon & MacFarlane, P.C.

(57) ABSTRACT

A control system for an automatic transmission, when hydraulically controlling the speed ratio of a belt type continuously variable transmission that transmits power from an engine to driving wheels by shifting or speed change, limits the shift speed to or below a predetermined value when an accelerator pedal is off and the engine rotational speed is at or below a predetermined speed. As a result, it is possible to avoid a driver from feeling uncomfortable when shifting with the accelerator off.

3 Claims, 5 Drawing Sheets

(51) Int. Cl.
*F16H 61/02* (2006.01)
*F16H 61/08* (2006.01)
*F16H 61/662* (2006.01)
*F16H 59/36* (2006.01)
*F16H 59/14* (2006.01)
*F16H 61/04* (2006.01)
*B60W 30/18* (2012.01)

(52) U.S. Cl.
CPC ....... *F16H 61/66259* (2013.01); *F16H 61/08* (2013.01); *F16H 61/66227* (2013.01); *F16H 61/66236* (2013.01); *F16H 2059/366* (2013.01)

(58) Field of Classification Search
CPC ......... F16H 61/66236; F16H 2059/366; F16H 2059/144; F16H 2059/186; F16H 2061/0496; B60W 30/18072; B60W 2510/0647; B60W 2710/0655
See application file for complete search history.

(56) References Cited

U.S. PATENT DOCUMENTS

| | | | |
|---|---|---|---|
| 8,585,542 B2* | 11/2013 | Takahashi | F16H 61/061 477/118 |
| 8,914,203 B2* | 12/2014 | Kodama | F16H 61/66272 477/45 |
| 9,022,900 B2* | 5/2015 | Suzuki | F16H 61/16 477/41 |
| 9,656,676 B2* | 5/2017 | Mitsuyasu | B60W 30/18172 |
| 2012/0258825 A1 | 10/2012 | Kodama et al. | |
| 2016/0230821 A1* | 8/2016 | Morino | F16D 48/02 |

FOREIGN PATENT DOCUMENTS

| | | |
|---|---|---|
| CN | 103174827 A | 6/2013 |
| CN | 103697155 A | 4/2014 |
| JP | H0932899 A | 2/1997 |
| JP | 201174063 A | 4/2011 |
| WO | 2011074063 A1 | 6/2011 |

* cited by examiner

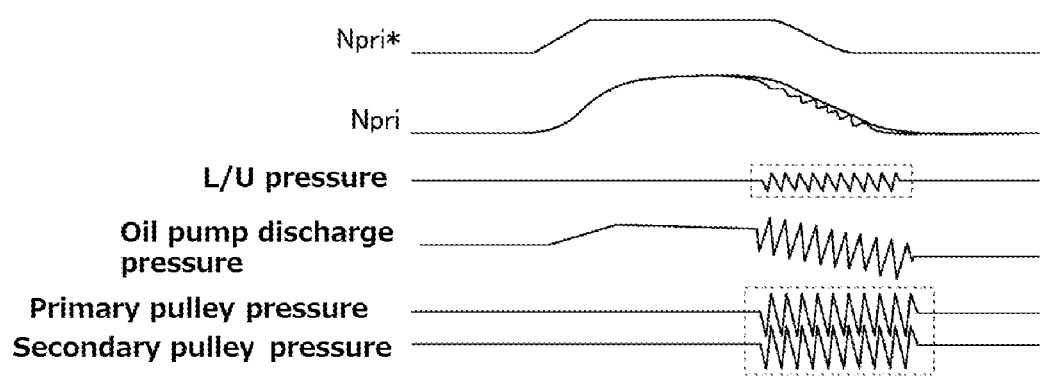
FIG. 7A Conventional
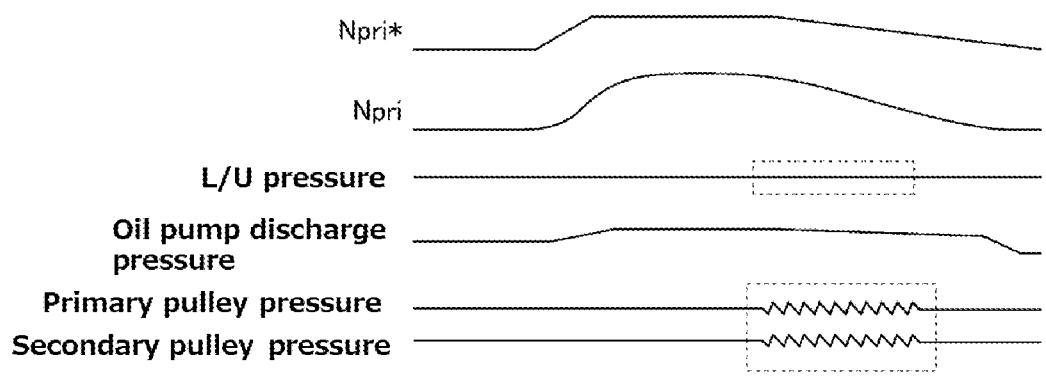
FIG. 7B First embodiment

CONTROL SYSTEM FOR AUTOMATIC TRANSMISSION

CROSS REFERENCE TO RELATED APPLICATION

The present application claims priority to Japanese Patent Application No. 2015-021683, filed Feb. 6, 2015, incorporated herein in its entirety.

TECHNICAL FIELD

The present invention relates to a control system for an automatic transmission.

BACKGROUND

As a control system for an automatic transmission, a conventional technique is known as described for example in Japanese Patent No. 3870676. In this publication, occurrence of excessive engine braking force is suppressed by switching a target engine rotational speed depending on an engine load when an accelerator pedal is off and released. Specifically, the target engine speed is set at a high speed while the target engine speed is set at a low speed when a throttle opening is small.

However, if the above control is applied to a belt-type continuously variable transmission, when changing the target engine speed in an accelerator pedal off state, shifting of the belt type continuously variable transmission is performed. Then, a problem of vehicle vibration occurs when the shift speed is high due to hydraulic vibration.

SUMMARY

The present invention focuses on the above problem, and aims to provide a control system for an automatic transmission that is capable to avoid discomfort for the driver during a shift in the accelerator pedal off state, For this purpose, according to the present invention, when controlling hydraulically the speed ratio of the belt type continuously variable transmission (CVT ratio) that transmits power from the engine to driving wheels by speed-change or shifting, the shift speed or shift rate is limited or restricted below a predetermined value when an accelerator pedal is off or released, and the engine speed is at or below a predetermined value.

Therefore, it is possible to suppress the hydraulic pressure vibration of the belt type continuously variable transmission at the time of shifting to thereby avoid giving uncomfortable feeling to the driver.

BRIEF DESCRIPTION OF THE DRAWINGS

FIGS. 7A and 7B are time charts showing a relationship between the presence of the shift speed limit process and pressure vibration.

Figure 1:
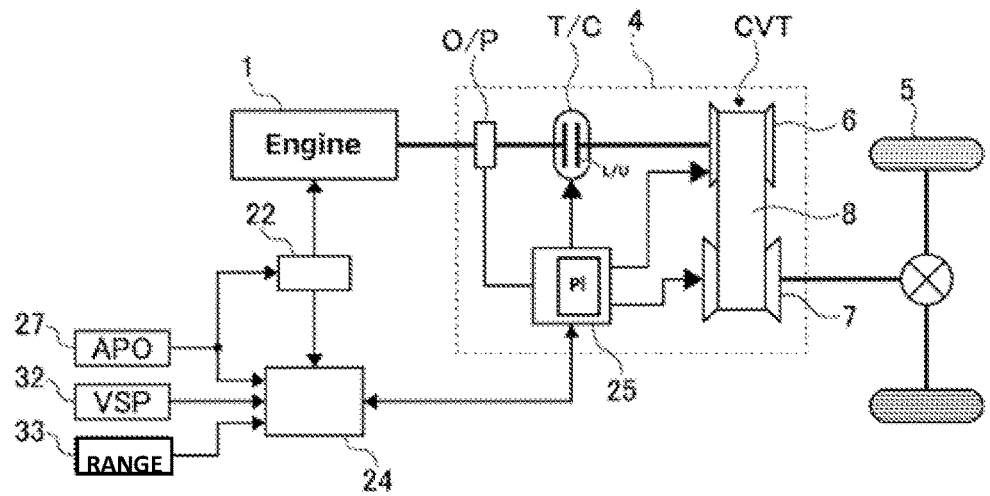
FIG. 1 is a schematic system diagram showing a drive system and its overall control system of a vehicle in a first embodiment.

DESCRIPTION OF REFERENCE NUMERALS 1 engine
4 continuously variable transmission
5 drive wheel
6 primary pulley
7 secondary pulley
8 belt
22 engine controller
24 transmission controller
25 control valve unit
27 accelerator pedal opening sensor
32 vehicle speed sensor
CVT variator (belt-type continuously variable transmission mechanism)
L/U lock-up clutch
T/C torque converter

DETAILED DESCRIPTION OF THE EMBODIMENTS

FIG. 1 is a schematic system diagram showing a drive system and its overall control system of a vehicle having a control system for an automatic transmission in a first embodiment. An engine 1 is selectively coupled to be drivingly connected to driving wheels 5 via a continuously variable transmission 4 of the V-belt type.

A variator CVT of the continuously variable transmission 4 is a V-belt type continuously variable transmission mechanism having a primary pulley 6, a secondary pulley 7, and a V-belt 8 (endless flexible member) looped around between these pulleys 6, 7. In the present embodiment, the V-belt 8 adopts a structure of bundling a plurality of elements by an endless belt. However, the structure is not particularly limited and may be formed in a chain system or the like. The primary pulley 6 is coupled to a crankshaft of the engine 1 via a torque converter T/C, and a secondary pulley 7 is coupled to the driving wheels 5 via a differential gear. Power from the engine 1 is inputted to the primary pulley 6 via the torque converter T/C with a lock-up clutch L/U. Subsequently, the power is transmitted to the V-belt 8, and the secondary pulley 7 in this order for vehicle travelling.

During engine power transmission, while reducing the pulley V groove width of the primary pulley 6, by increasing the pulley V groove width of the secondary pulley 7, the winding diameter of the V-belt 8 at the secondary is increased. At the same time, the winding diameter of the secondary pulley 7 is reduced. As a result, the variator CVT performs an up-shift to a High side pulley ratio (High side speed ratio).

On the contrary, by reducing a pulley V-groove width of the secondary pulley 7 while allowing the pulley V-groove width of the primary pulley 6 to be increased, the winding diameter of the V belt 8 at the primary pulley 6 is reduced and the winding diameter of the secondary pulley 7 is increased at the same time. As a result, the variator CVT performs a down shift to a Low-side pulley ratio (Low side speed ratio).

The variator CVT includes a primary rotational speed sensor for detecting a primary rotational speed Npri representing the rotational speed of the primary pulley 6, and a secondary rotational speed sensor for detecting a secondary rotational speed Nsec representing the rotational speed of the secondary pulley 7. An actual speed ratio or CVT ratio is calculated based on the rotational speeds detected by these rotational speed sensors. Further, hydraulic control of each pulley will be performed so that the actual speed ratio reaches a target speed ratio.

An engine controller 22 receives a signal from an accelerator pedal opening sensor 27 for detecting an accelerator pedal depression amount (accelerator pedal opening) APO to control the engine 1. A transmission controller 24 performs shift control of the variator CVT based on the signal from the accelerator pedal opening sensor 27, a signal from a vehicle speed sensor 32, a signal from a vehicle speed sensor 32, a signal from a range position 33, and a torque indicative signal from the engine controller 32. The controls of the variator CVT and the lock-up clutch L/U are performed based on a hydraulic pressure supplied from a mechanical oil pump O/P which is driven by the engine.

A control valve unit 25, in response to a command from the transmission controller 24, regulates hydraulic oil to a line pressure P1 to correspond to a required vehicle driving force. In addition, in response to a lock-up command from the transmission controller 24, the line pressure P1 is supplied appropriately to the torque converter T/C to thereby control the engagement state of the lock-up clutch L/U so as to produce a L/U state in which input and output elements are directly connected to each other on as-required basis. Further, by pressure regulating the line pressure P1 to a primary pulley pressure in response to a CVT speed ratio command from the transmission controller 24 for supply to the primary pulley 6. Thus, the V groove-width of the primary pulley 6 and the V groove-width of the secondary pulley 7 will be controlled to conform to the command from the transmission controller 24 to thereby a CVT shift speed ratio command from the transmission controller 24. Moreover, by pressure regulating the line pressure PL to the secondary pulley pressure according to a clamping force command from the transmission controller 24 for supply to the secondary pulley 7, the V-belt 8 is sandwiched and pressed so that the V-belt 8 does not slip on the secondary pulley 7.

Figure 2:
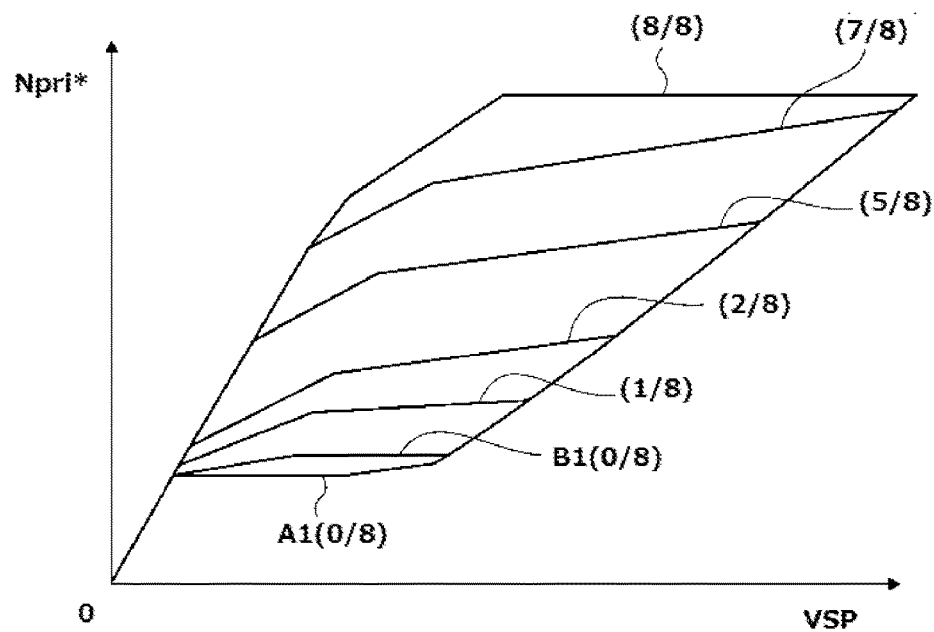
FIG. 2 is a shift map in the first embodiment.

Now, a description will be given of the shift control process. FIG. 2 is a shift map in the first embodiment. In the vehicle of the first embodiment, during traveling above a predetermined vehicle speed, lock-up clutch L/U is engaged and the vehicle travels by transmitting the rotational speed of the engine 1 directly to the primary pulley 6. Therefore, the primary rotational speed Npri of the primary pulley 6 and the engine rotational speed Ne used in the following description are described as being rotated at substantially the same rotational speed.

The transmission controller 24, while referring to a preset shift map shown in FIG. 2, according to the operating state of the vehicle (vehicle speed VSP, primary rotational speed Npri, and accelerator pedal opening APO in the first embodiment), the continuous or stepless transmission is controlled. In the shift map, similarly to a shift map of a conventional belt type continuously variable transmission, shift lines are prepared for each accelerator opening APO, and the shift of the continuously variable transmission 4 is performed according to the shift line selected according to the accelerator pedal opening APO. When a target speed ratio is determined, a target engine rotational speed is set based on the current vehicle speed VSP, and the speed ratio is controlled so that the engine rotational speed matches the target engine rotational speed.

Here, in the shift map, in the so-called coasting state with the accelerator pedal opening APO being 0, a first coasting line A1 in which the target primary rotation speed Npri * is set lower, and a second coasting line B1 with the target primary rotational speed Npri * that is slightly higher than the first coasting line A1 are set respectively. The transmission controller 24 includes an engine braking force determination unit for determining whether a stronger engine braking force is required based on the running state. For example, a determination is made whether a mode is required and intended for generation of the engine braking force such as in a manual mode or a normal fuel consumption preferred mode. Then, when it is determined that the engine braking force is required, a target rotational speed correction control at accelerator pedal being off is actuated, and the target primary rotational speed Npri * is calculated based on the second coast line B1.

Thus, it is possible to set the primary rotation speed Npri higher and ensure sufficient engine braking force. On the other hand, when the engine braking force is determined to be unnecessary, the target rotational speed correction control at accelerator pedal off is terminated, and the target primary rotation speed Npri * based on the first coasting line A1 is calculated. This makes it possible to set the primary rotation speed Npri lower and avoid generation of unnecessary engine braking force.

[Shift Speed Limiting Process]

When controlling the speed ratio of the continuously variable transmission 4, the target primary rotational speed Npri * is set first based on the vehicle speed VSP and the accelerator pedal opening APO, and subsequently in order to achieve the speed ratio which may achieve the target primary rotation speed Npri *, a pulley pressure of the primary pulley 6 and the secondary pulley 7 is controlled. Also, the target primary rotational speed Npri * is set higher in accordance with increase in the accelerator opening APO. Therefore, when reducing the target primary rotation speed Npri *, the speed ratio is shifted to the higher side to lower the engine rotational speed Ne. Accordingly, since the engine rotational speed Ne can be set to be lower, occurrence of excessive engine braking is suppressed to thereby avoid uncomfortable feeling to the driver.

FIG. 7A is a time chart representing each hydraulic pressure in the state in which the target primary rotation speed Npri * is reduced. When changing the target primary rotational speed Npri * to low rotation speed without giving a limit to the shift speed, the shift speed of the variator CVT becomes faster. In order to ensure the shift speed to the high side, hydraulic pressure has to be supplied to the secondary pulley 7 at once. Here, the variator CVT is supplied with hydraulic pressure from a mechanical oil pump O/P, and the pump discharge flow rate decreases with decreasing engine speed Ne. Further, since the accelerator pedal is off, the line pressure is also set low. Due to this situation, vibration in the oil pump discharge pressure, and subsequently vibration of each pulley pressure, is caused. At the same time, the lock-up pressure of the lock-up clutch L/U also vibrates, which will cause a longitudinal acceleration vibration to the driving wheels to thereby impart discomfort to the driver.

Therefore, in the first embodiment, when reducing the target primary rotation speed Npri * with the accelerator pedal off, by limiting the shift speed, the change in the secondary pulley pressure to be experienced by the secondary pulley 7 is suppressed and the vibration in the pump discharge pressure is suppressed. Thus, the discomfort associated with the vibration may be avoided.

Figure 3:
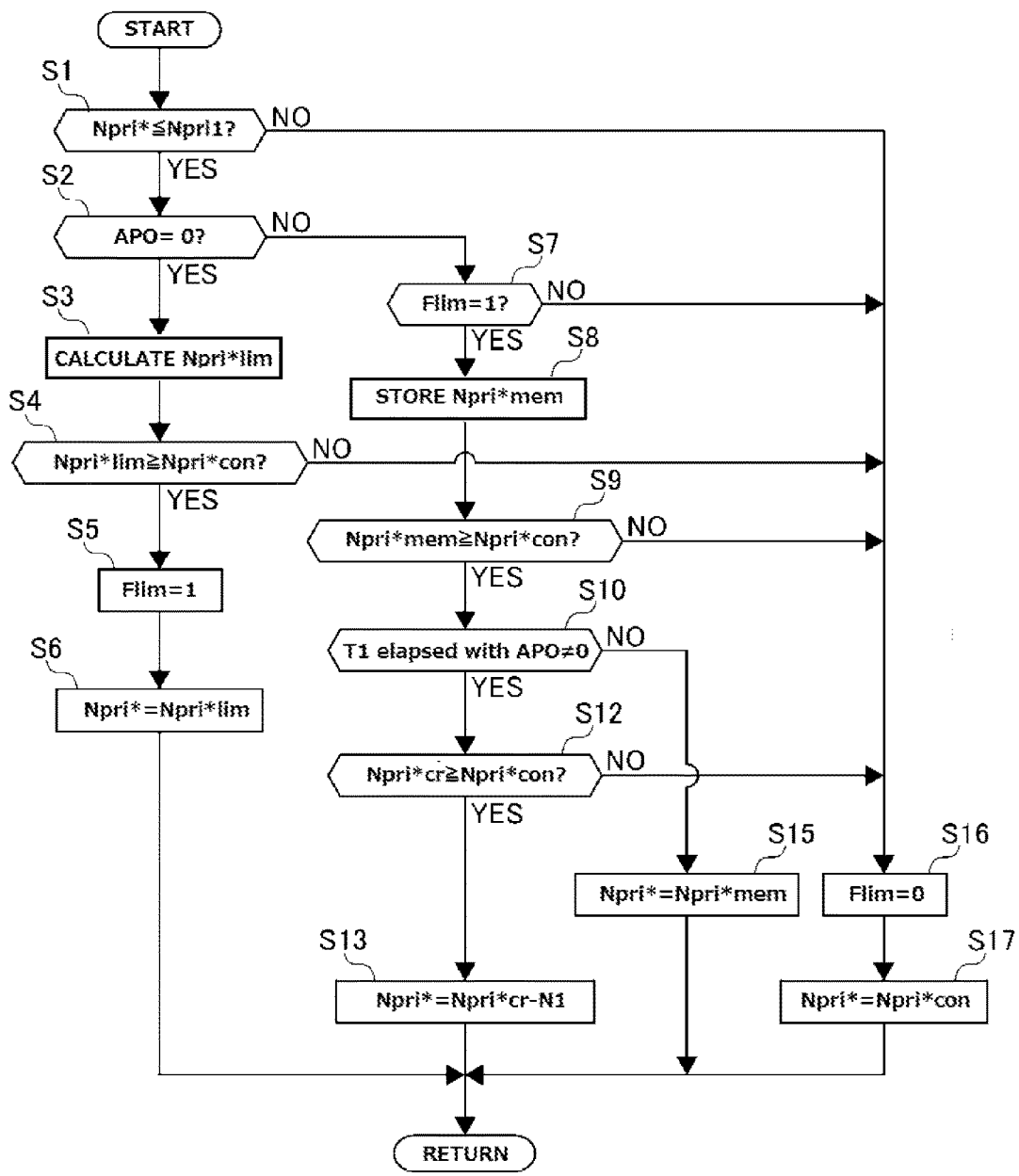
FIG. 3 is a flowchart showing a shift speed limit process in the first embodiment.

FIG. 3 is a flow chart showing the shift speed limit process in the first embodiment. Here, a target primary rotational speed calculated based on a normal speed ratio control is referred to as Npri*con, the target primary rotational speed when limiting shift speed as Npri*lim, and the target primary rotational speed that is finally determined in the present control flow is referred to as Npri *, respectively. Incidentally, the normal target primary rotational speed Npri*con calculated by the normal speed ratio control also includes a value corrected by the target rotational speed correction control at accelerator pedal off.

In step S1, it is determined whether or not the target primary rotational speed Npri * is at or below a predetermined value Npri1. When determined at or below the predetermined value Npri1, control proceeds to step S2. When determined to be greater than the predetermined value Npri1, control proceeds to step S16 to set a shift speed limit flag Flim to 0 and further proceeds to step S17 to set Npri * to Npri*con. Note that, if the shift speed is limited at the rotational speed higher than the predetermined value Npri1, there is a risk that excessive engine braking force is generated all time. In other words, even limiting the shift speed below a predetermined value Npri1, the driver would not be given a sense of discomfort due to the occurrence of the excessive engine braking force.

In step S2, it is determined whether or not the accelerator pedal is on (i.e. being depressed). When the accelerator pedal is off (not depressed), control proceeds to step S3. When the accelerator pedal is on, control proceeds to step S7.

In step S3, the target primary rotational speed Npri*lim with the shift speed limited is calculated. In this calculation, for example, the shift speed may be limited by performing a filtering process such as using a low-pass filter to the normal target primary rotation speed Npri*con. Alternatively, the shift speed may be limited by performing a limiter process to be equal to or below a predetermined shift speed set in advance. The calculation method to limit the shift is not particularly limited.

In step S4, it is determined whether or not the target primary rotational speed with the shift speed limited Npri*lim is at or above Npri*con. When determined at or above Npri*con, control proceeds to step S5 to set the shift speed limit flag Flim to 1. On the other hand, when determined to be below Npri*con, control proceeds to set the shift speed limit flag Flim to 0 in step S16 and to set Npri * to Npri*con in step S17. In step S6, Npri * is set to Npri*lim, and a shift control is performed while limiting the shift speed. Accordingly, it is possible to suppress the pressure vibrations caused by the shift operation.

In step S7, it is determined whether or not the shift speed limit flag Flim is 1. When determined to be 1, it is determined that the shift control limit process is being performed and control proceeds to step S8. When determined to be 0, control proceeds to steps S16, S17, and the normal shift control will be performed. Note that step S7 is selected from a state in which the accelerator pedal is in a depressed condition.

In step S8, the current target primary rotational speed Npri * is stored and set as a target primary rotational speed stored value Npri*mem.

In step S9, it is determined whether or not the target primary rotational speed stored value Npri*mem is at or above Npri*con. When at or above Npri*con, control proceeds to step S10. When below Npri*con, control proceeds to steps S 16, S 17 to run the normal shift control.

In step S10, it is determined whether or not the state in which the accelerator pedal is depressed, has continued for a predetermined time T1. Unless the predetermined time T1 has elapsed, control proceeds to step S15 set the target primary rotational speed Npri * to the target primary rotational speed stored value Npri*mem. In other words, when the accelerator pedal is depressed during the shift speed limit process, the speed ratio is maintained for the predetermined time T1.

That is, during coasting, when the engine rotational speed Ne is higher than the idling speed, fuel injection to the engine 1 is stopped to improve fuel efficiency. However, when the accelerator pedal is depressed, the fuel injection of the engine 1 is restarted, and torque is outputted from the engine 1. If the variator CVT performs a shift simultaneously in this state, there is a risk that shock accompanying the fuel injection restart to the engine 1 is likely to increase. Therefore, in the scene in which the fuel injection of the engine 1 is restarted, the shock is avoided by maintaining the speed ratio.

In step S12, a target primary rotational speed Npri*cr when shifting from Npri*mem to Npri*con is calculated. At the same time, it is determined whether or not Npri*cr is at or above Npri*con. When at or above Npri*con, control proceeds to step S13. When below Npri*con, control proceeds to steps S16, S17 to perform the normal shift or speed change control.

In step S13, the target primary rotational speed Npri * is set to a value obtained by subtracting from Npri*cr a predetermined rotational speed N1 (i.e., Npri *=Npri*cr−N1). In addition, after setting the Npri *, the next Npri*cr is replaced with the present Npri * (=Npri*cr−N1).

Figure 4:
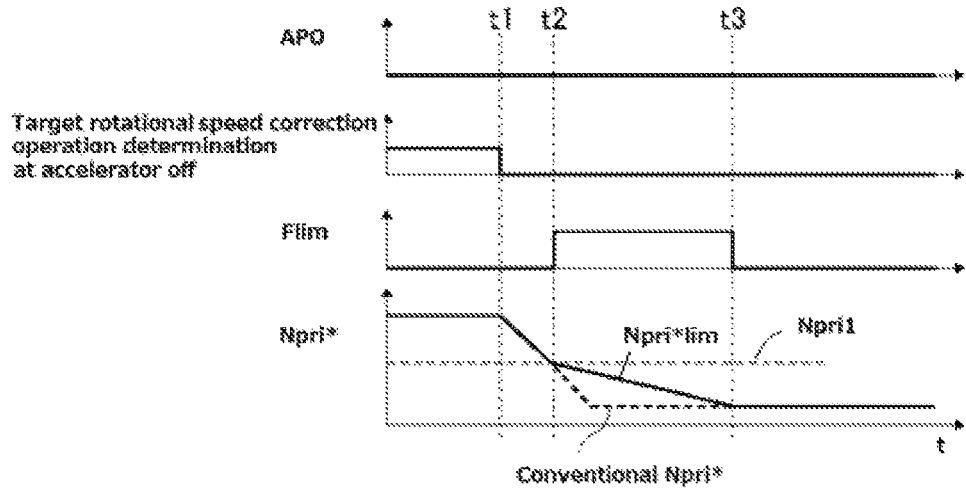
FIG. 4 is a time chart showing a shift speed limit process in the first embodiment.

A description is now made of the operation based on the above flowchart. FIG. 4 is a time chart showing a shift speed limit process in the first embodiment. In an initial state of the time chart, it is assumed that the accelerator pedal is off, and the target primary rotation speed Npri * is set to a higher rotational speed based on the second coasting line B1 by the target rotational speed limit control at accelerator pedal off.

At time t1, the target rotational speed correction control at accelerator pedal off is finished, Npri * is shifted to a lower rotational speed based the Npri * first coasting line A1. At this time, Npri * is a higher rotational speed than the predetermined value Npri1, so that shift speed is not particularly limited and uncomfortable feel such as continuous operation of engine braking is not present. At time t2, when Npri * is equal to or below the predetermined value Npri1, the shift speed limit flag Flim is set to 1, and the shift speed is limited. Then, at time t3, when Npri * coincides with the target primary rotational speed Npri * based on the first coasting line A1, the shift speed limit flag Flim is set to 0 to thereby shift to the normal shift control.

FIGS. 7A and 7B are time charts showing a relationship between presence or absence of the shift speed limit process and hydraulic vibration. As shown in FIG. 7A, at the time of Npri * being changed, when the shift speed is not specifically limited, an oil pump discharge pressure is vibrated. Along with this situation, the pulley's hydraulic pressure and the lock-up pressure of the lock-up clutch L/U are also subject to vibration, which would give a sense of discomfort to the driver. In contrast, as shown in FIG. 7B, at the time of Npri * being changed, by limiting the shift speed, it is possible to suppress the vibration of each hydraulic pressure. Especially the vibration in the lock-up pressure of the lock-up clutch L/U can be eliminated.

This allows changing the target primary rotational speed Npri * without giving discomfort to the driver.

Figure 5:
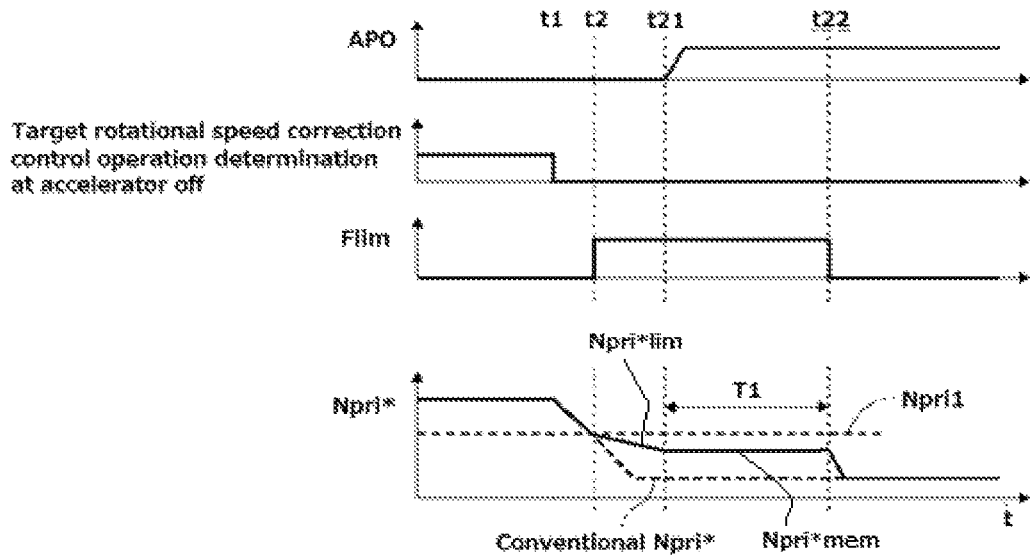
FIG. 5 is a time chart showing a case in which an accelerator pedal is depressed during the shifting speed limit process is underway in the first embodiment.

FIG. 5 is a time chart showing a case in which the accelerator pedal is depressed during the shift speed limit process in the first embodiment. Since the operation until time t1, t2 is the same as FIG. 4, only the operation after time t2 will be described.

At time t21, upon the accelerator pedal being depressed, the target primary rotational speed Npri * at that time is maintained, and the target primary rotational speed stored value Npri*mem is maintained for the predetermined time T1. During this time, although the fuel injection of the engine 1 is restarted, since the speed ratio is maintained, the shock and the like caused by the fuel injection restart can be sufficiently suppressed.

At the time t22, when the predetermined time T1 has elapsed, the maintained target primary rotational speed stored value Npri*mem is approaching by a predetermined rotational speed N1 to the normal target primary rotational speed Npri*con so as to shift to the normal shift control operation.

Figure 6:
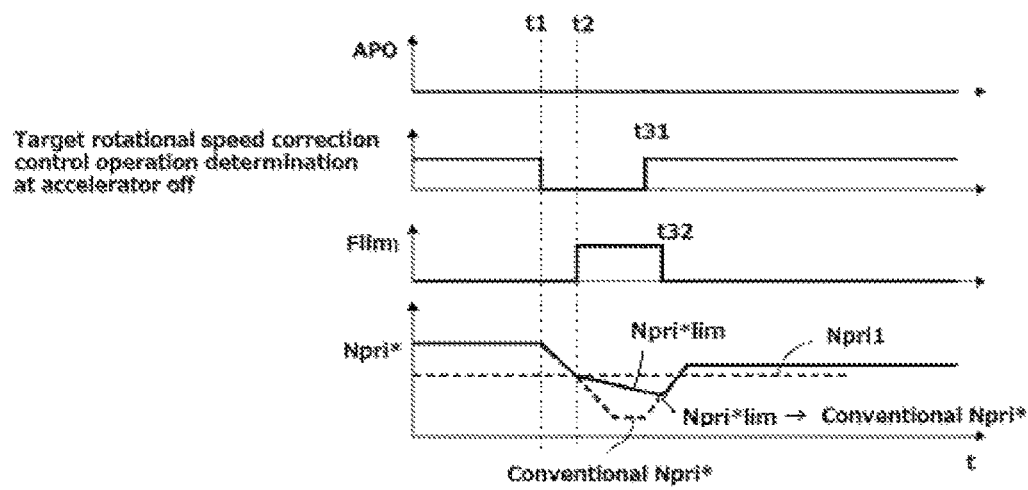
FIG. 6 is a time chart in a case in which the target primary rotational speed during the shifting speed limit process in the first embodiment is switched from a first coasting line A1 base to a second coasting line B1 base.

FIG. 6 is a time chart in which the target primary rotational speed is switched or shifted from the second coast line B1 base to the first coast line A1 base during execution of the shift speed limit process of the first embodiment, and further, in the midst of the shift, switching is further made to the second coasting line B1 base. Because the operation until time t1, t2 is the same as FIG. 4, description is given only of the operation following time t2.

At time t 31, the target rotational correction control at accelerator pedal off is executed again, and when the target primary rotational speed Npri * based on the first coasting line A1 is changed to the target primary rotation speed Npri * based on the second coasting line B1, the normal target primary rotation speed Npri*con calculated based on the normal speed ratio control gradually starts to rise.

At time t32, when the current target primary rotational speed Npri*lim with the shift speed limited falls below the normal target primary rotational speed Npri*con, the target primary rotational speed Npri * is switched from Npri*lim to Npri*con. Thus, when increasing the engine speed based on an engine braking demand, etc., even when the target primary rotational speed Npri * is equal to or below the predetermined value Npri1, the engine speed can be increased without applying a limitation on the shift speed. Thus, the responsiveness can be secured.

As described above, various operational effects may be achieved in the first embodiment.

(1) Provided are a variator CVT (belt-type continuously variable transmission) that transmits power from an engine 1 to driving wheels by shifting;

a transmission controller 24 (speed ratio control unit) that hydraulically controls a speed ratio of the variator CVT;

wherein, when an accelerator pedal is released and thus in an off state, and, when a target primary rotation speed Npri * (engine rotational speed) is equal to or below a predetermined value Npri1, the shift speed of the variator CVT is limited to or below a predetermined value in steps S3, S4, and S5 (shift speed limit unit).

Therefore, it is possible to suppress pressure vibration of the variator CVT at the time of shift to thereby avoid a driver from feeling discomfort.

(2) In step S4, when Npri*lim<Npri*con (when the engine rotational speed changes in the rising direction when the shift speed is being limited), Npri * is set to Npri*con (to cancel or remove to limit the shift speed).

Thus, for example, when increasing the engine speed in response to an engine braking demand, etc., it is possible to increase the engine rotational speed without restriction on the shift speed even when the target primary rotation speed Npri * is equal to or below the predetermined value Npri1. Thus, the responsiveness can be secured.

(3) In steps S 2, S 8, when the accelerator pedal is depressed while the shift speed is being limited, Npri*mem representing the speed ratio at that time will be maintained for a predetermined time T1.

Therefore, even when the fuel injection of the engine 1 is restarted, since the speed ratio is maintained, the shock and the like caused by the fuel injection restart can be sufficiently suppressed.

Other Embodiments

In the first embodiment, an example is shown in which an engine is applied to a vehicle as power source. However, the present invention is also applicable to a hybrid vehicle with a driving motor and the like. Also, in the first embodiment, a continuously variable transmission is shown with a variator CVT only. However, the present invention may be applicable to a sub-transmission 31 comprising a belt type continuously variable transmission.

In addition, in the first embodiment, an example is shown in which the target primary rotational speed is shifted from the second coast line B1 base to the first coast line A1 base during execution of the shift speed limit process, and further, in the midst of the shift, switching is further made to the second coasting line B1 base. However, the present invention may be equally applied to other shift speed demands such as in response to preparation of re-acceleration or when upshifting in response to release of a shift command from a coasting rotational speed enhanced state due to a rotational speed holding function during cornering operation and the like.

The invention claimed is:

1. A control system for an automatic transmission, comprising:
    a belt type continuously variable transmission for transmitting power from an engine to driving wheels by shifting;
    a speed ratio control unit that hydraulically controls a speed ratio of the belt type continuously variable transmission; and
    a shift speed limiting unit that limits a shift speed of the belt type continuously variable transmission to or below a first predetermined value when an accelerator pedal is off and an engine rotational speed is at or below a second predetermined value.

2. The control system according to claim 1,
    wherein the shift speed limiting unit is configured to cancel to limit the shift speed when the engine rotational speed changes in a direction to rise when the shift speed is being limited.

3. The control system according to claim 2, wherein the shift speed limiting unit is further configured, when the accelerator pedal is depressed while limiting the shift speed, to maintain the speed ration at that time for a predetermined time period.

* * * * *